US011579243B2

(12) United States Patent
Mayer et al.

(10) Patent No.: US 11,579,243 B2
(45) Date of Patent: Feb. 14, 2023

(54) DEVICE FOR EMITTING AND RECEIVING ELECTROMAGNETIC RADIATION

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 16/754,444

(22) PCT Filed: Oct. 11, 2018

(86) PCT No.: PCT/EP2018/077703
§ 371 (c)(1),
(2) Date: Apr. 8, 2020

(87) PCT Pub. No.: WO2019/120672
PCT Pub. Date: Jun. 27, 2019

(65) Prior Publication Data
US 2020/0271751 A1     Aug. 27, 2020

(30) Foreign Application Priority Data
Dec. 20, 2017   (DE) ..................... 10 2017 223 471.7

(51) Int. Cl.
*G01S 7/02*     (2006.01)
*G01S 7/03*     (2006.01)
(Continued)

(52) U.S. Cl.
CPC ................ *G01S 7/025* (2013.01); *G01S 7/03* (2013.01); *G01S 7/411* (2013.01); *G01S 13/931* (2013.01);
(Continued)

(58) Field of Classification Search
CPC . G01S 7/025; G01S 7/03; G01S 7/411; G01S 13/931; G01S 13/003;
(Continued)

(56) References Cited

U.S. PATENT DOCUMENTS 5,483,248 A * 1/1996 Milroy .................. H01Q 13/28
343/785
6,147,648 A    11/2000 Granholm et al.
(Continued)

FOREIGN PATENT DOCUMENTS

CN    102053245 A    5/2011
CN    102544724 A    7/2012
(Continued)

OTHER PUBLICATIONS

International Search Report for PCT/EP2018/077703, dated Dec. 19, 2018.

*Primary Examiner* — Bernarr E Gregory
*Assistant Examiner* — Yonghong Li
(74) *Attorney, Agent, or Firm* — Norton Rose Fulbright US LLP; Gerard Messina (57) ABSTRACT

A device for emitting and receiving electromagnetic radiation, in which different antennas are used for the emitting and receiving, a first antenna or first group being used for the transmission in a first polarization form, a second antenna or second group being used for the transmission in a second polarization form, and a third antenna or third group being used for receiving the reflected electromagnetic radiation that was emitted by the first antenna or first group and by the second antenna or second group. The device may be fixed in place on a motor vehicle and used for object detection within the framework of a distance and speed control or a collision avoidance, and the polarimetric information obtained from the different receiving levels during the propagation of the two differently polarized electromagnetic waves via differ-
(Continued)

ent propagation paths is able to be used for ascertaining a weather-related road condition.

18 Claims, 6 Drawing Sheets (51) Int. Cl.
*G01S 7/41* (2006.01)
*G01S 13/931* (2020.01)
*H01Q 1/32* (2006.01)
*H01Q 21/06* (2006.01)
*H01Q 21/24* (2006.01)

(52) U.S. Cl.
CPC ......... *H01Q 1/3233* (2013.01); *H01Q 21/065* (2013.01); *H01Q 21/24* (2013.01); *G01S 2013/93271* (2020.01)

(58) Field of Classification Search
CPC ............ G01S 2013/9371; G01S 7/026; H01Q 1/3233; H01Q 21/065; H01Q 21/24
See application file for complete search history.

(56) References Cited

U.S. PATENT DOCUMENTS

| | | | | |
|---|---|---|---|---|
| 8,264,398 | B2 * | 9/2012 | Kamo | G01S 13/955 342/70 |
| 2007/0069966 | A1 | 3/2007 | Rolnik | |
| 2015/0042507 | A1 * | 2/2015 | Jeong | B60W 30/14 342/70 |

FOREIGN PATENT DOCUMENTS

| | | |
|---|---|---|
| CN | 103707887 A | 4/2014 |
| CN | 104364965 A | 2/2015 |
| CN | 206259479 U | 6/2017 |
| CN | 106972244 A | 7/2017 |
| CN | 107275776 A | 10/2017 |
| DE | 102013102424 A1 | 9/2014 |
| DE | 102014118031 A1 | 6/2016 |
| DE | 102015200027 A1 | 7/2016 |
| JP | 2010014533 A | 1/2010 |
| JP | 2015190809 A | 11/2015 |
| JP | 2016217834 A | 12/2016 |
| KR | 20130053701 A | 5/2013 |
| KR | 101462913 B1 | 11/2014 |
| KR | 101462913 B1 * | 11/2014 |
| KR | 20170092906 A | 8/2017 |
| WO | 8303309 A1 | 9/1983 |
| WO | 8801062 A1 | 2/1988 |
| WO | 2006029936 A1 | 3/2006 |

* cited by examiner

DEVICE FOR EMITTING AND RECEIVING ELECTROMAGNETIC RADIATION

The present invention relates to a device for emitting and receiving electromagnetic radiation, in which different antennas are used for the emitting and receiving, a first antenna or a first group of antennas being used for the transmission in a first polarization form, a second antenna or a second group of antennas being used for the transmission in a second polarization form, and a third antenna or a third group of antennas being used for receiving the reflected electromagnetic radiation that was emitted by the first antenna or the first group of antennas as well as the second antenna or the second group of antennas. The device described within the framework of the present invention may advantageously be installed on a motor vehicle and be used for an object detection within the framework of a distance and speed control or a collision avoidance, and the polarimetric information obtained from the different receiving levels during the propagation of the two differently polarized electromagnetic waves via different propagation paths is able to be used for detecting the road condition, in particular for ascertaining the weather-related road condition.

BACKGROUND INFORMATION

German Patent Application No. DE 10 2015 200 027 A1 describes a device and a method for determining a characteristic of a measuring point. The device is developed to include a transmitter device by which electromagnetic radiation having a first polarization can be emitted so that electromagnetic waves having a second and/or third polarization can be generated through an optical reciprocal action with the measuring point. In addition, the device has a first detector device for detecting a first radiation power of electromagnetic waves having the second polarization generated at the measuring point, which a first measuring signal based on the detected first radiation power. Moreover, a second detector device is provided for detecting a second radiation power of electromagnetic waves having the third polarization generated at the measuring point, the third polarization differing from the second polarization and being provided for generating a second measuring signal based on the detected second radiation power. Characteristics of the measuring point are able to be determined by comparing the first measuring signal with the second measuring signal.

SUMMARY

In accordance with the present invention, an example system is provided, in particular for microwaves or millimeter waves, by which receiving signals in different polarization forms are emitted and received and are able to be separated from one another through a level comparison of the receiving signal, and to thereby carry out a road state detection, in particular a detection of the weather-related condition of the road surface.

Advantageous developments and refinements of the present invention are described herein.

The system for emitting and receiving electromagnetic radiation is developed as a bistatic sensor in which separate antennas or separate antenna groups are provided in each case for emitting and receiving the electromagnetic radiation.

In an advantageous manner, the first polarization form and the second polarization form are in essence mutually orthogonal polarizations. It may be provided that the first and the second polarization form are linearly/vertically and linearly/horizontally polarized or are polarized in a right-turning circular and left-turning circular manner or are linearly/diagonally and linearly/anti-diagonally polarized or have some other polarization forms that are orthogonal to one another. The term 'orthogonal polarization' is to be understood in such a way that the two polarization directions are linearly independent of each other. In addition, it is the subject matter of this further embodiment that the two polarization forms are only essentially orthogonal to each other because a 100% orthogonality of the two polarization forms is very difficult to achieve in reality. In reality, the present invention also functions with an only approximate orthogonality so that the exact, pure orthogonality may indeed also be a subject matter of this further development but the present invention is not restricted thereto.

In addition, it is advantageous that the third antenna or the third group of antennas is able to receive both the first polarization form and the second polarization form. After electromagnetic signals have been emitted with the aid of the first antenna or the first group of antennas and the second antenna or the second group of antennas, the third antenna or the third group of antennas is used to receive the electromagnetic signals. The receiving antenna or the receiving antennas is/are developed in such a way that the receiving antenna or the receiving antennas is/are able to receive signals that are in essence mutually orthogonal using a single antenna.

It is furthermore advantageous that the first antenna or the first group of antennas is made up of single columns or double columns transmitting in a horizontally polarized manner. A single column is a feed line which terminates in branching stub lines via a supply line, the length and width of the stub lines being developed so that they are able to radiate the electromagnetic signal. In a vertical alignment of the feed line on the circuit board, and with the normal vector of the circuit board being oriented in the transmission and receiving direction, a broad visual range of approximately +/−60° as well as a low gain in the main beam direction results in comparison with the second antenna or the second group of antennas. Because of the small aperture of the antenna, a broad detection field is therefore obtained but this detection field does not reach very far.

In the development of the first antenna or the first group of antennas in the form of double columns, both the radiated power and the aperture of the antenna become greater so that, depending on the application case, the detection range may also have a larger and narrower range than in the development that uses single columns. In addition, it is advantageous that the third antenna or the third group of antennas is made up of a combination of single columns or double columns, which receive in a horizontally polarized manner, according to the first antenna or the first group of antennas, and multi-column arrays of patch antennas, which receive in a vertically polarized manner, according to the second antenna or the second group of antennas. This makes it possible for the receiving antenna or the group of receiving antennas to receive the transmission signals of both transmission antennas or both groups of transmission antennas without requiring doubled space on the circuit board, and both polarization forms are able to be evaluated in the same receiving channel so that it is also not necessary to provide multiple receiving channels developed in parallel.

Moreover, it is provided that the second antenna or the second group of antennas is made up of one or a plurality of multi-column array(s) of patch antennas transmitting in a vertically polarized manner. In this type of development of the second antenna or the second group of antennas, branching supply lines switched in parallel are coupled to the supply line, i.e., one line for each antenna column, these supply lines extending geometrically further in parallel with one another and in the process supplying a row of patch antennas which are switched in series with one another. In a vertical alignment of the feed lines of the plurality of columns of antenna arrays, a narrower visual range of approximately +/−20° and a higher gain in the main radiation direction comes about in comparison with the first antenna or the first group of antennas as a result of the larger aperture of this antenna. In this case, a detection range that is narrower but has a greater range is obtained.

In addition, it is advantageous in accordance with the present invention that the transmission signals of the first antenna or the first group of antennas and the transmission signals of the second antenna or the second group of antennas detect different distance ranges. Furthermore, in combination therewith or as an alternative, it may be provided that the transmission signals of the first antenna or the first group of antennas and the transmission signals of the second antenna or the second group of antennas have different opening angles of the detection range.

Particularly advantageous is an example embodiment of the present invention in which the first antenna or the first group of antennas, which is made up of single columns or double columns transmitting in a horizontally polarized manner, has a short distance range and a large opening angle of the detection range, and the second antenna or the second group of antennas, which is made up of a single or a plurality of multi-column array(s) of patch antenna(s) transmitting in a vertically polarized manner has a long distance range and a small opening angle of the detection range.

It is furthermore provided that the third antenna or the third group of antennas determines the polarimetric information of the reflecting object on the basis of the receiving levels of the receiving signals of the two orthogonal polarization forms. It may be particularly advantageous in this context if the different group factors of the involved transmission and receiving antennas and also the different gain factors of the antennas are taken into account when determining the receiving levels of the receiving signals of the two essentially orthogonal polarization forms.

Because of the different apertures and therefore different ranges and opening angles, the receiving levels of the two electromagnetic signals having different polarization forms are not directly comparable to each other. However, if these receiving levels are weighted by the respective gain and group factors, then it is possible to compare the receiving levels to one another, and the reflectivity of the individual polarization forms, possibly on different receiving paths, is able to be evaluated.

It is furthermore advantageous in accordance with the present invention that the device is fixed in place on a motor vehicle, in particular at the front of the motor vehicle, and performs an object detection within the framework of a distance and speed control or a collision-avoidance function. Since the receiving signals also allow for an evaluation of the signal propagation time and a Doppler effect of a detected object in addition to the polarimetric measurement, the system according to the present invention is not only able to carry out a polarimetric measurement but also a distance control, or it is able to trigger emergency braking in order to avoid a collision.

It is particularly advantageous in this context that during the propagation of the two differently polarized electromagnetic waves via different propagation paths, the polarimetric information obtained from the different receiving levels is used for detecting the road condition, in particular to ascertain the weather-dependent road condition. For example, this may be done by analyzing the reflection capability of different propagation paths and thereby detecting the roughness of the asphalt surface of the traveled road, the presence of potholes in the road surface, corrugations in the road surface or a weather-related state of the road surface and it is particularly ascertained whether the road surface is dry, wet, snow-covered or iced over. In an advantageous manner, a μ factor may be allocated directly to the measuring result in order to describe the tire grip on the currently traveled road surface.

Additional features, application possibilities and advantages of the present invention result from the description below of exemplary embodiments of the present invention, which are illustrated in the figures. All described or illustrated features form the subject matter of the present invention, on their own or in any combination, regardless of their combination or their wording or presentation in the description herein or in the figures.

BRIEF DESCRIPTION OF THE DRAWINGS

Hereinafter, exemplary embodiments of the present invention are described with the aid of figures.

DETAILED DESCRIPTION OF EXAMPLE EMBODIMENTS

Figure 1:
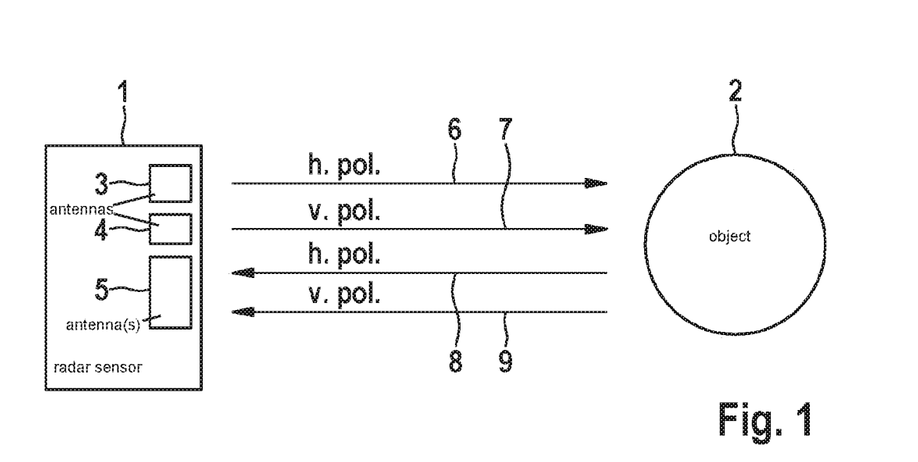
FIG. 1 shows a schematic illustration of the method of functioning of a transmitter and receiver system according to the present invention.

FIG. 1 shows a schematic illustration of an example method of functioning of a transmitter and receiver system according to the present invention. A radar sensor 1 can be seen, which is shown on the left side, and also a detected object 2, which is schematically shown as a circle in the right half of the figures. Radar sensor 1 also has a first antenna or a first group of antennas 3, by which a first transmission signal Tx1 is emitted. Moreover, radar sensor 1 has a second antenna or a second group of antennas 4, by which a second transmission signal Tx2 is emitted. First antenna or first group of antennas 3 exemplarily transmits a horizontally polarized transmission signal 6 in the direction of object 2 to be detected. The second antenna or second group of antennas transmits a vertically polarized transmission signal 7, which is also shown as Tx2. The two transmission signals Tx1 and Tx2 6, 7, which in essence have orthogonally polarized polarization forms relative to each other, are reflected at detected object 2 and received by the third antenna or third group of antennas 5 of radar sensor 1 as receiving signals 8, which are developed as a horizontally polarized receiving signal, as well as receiving signal 9, which is developed as a vertically polarized receiving signal. The third antenna or third group of antennas 5 of radar sensor 1 is developed to receive reflected transmission signals Tx1 and Tx2 as receiving signal Rx. Receiving signals 8, 9 may also have different propagation paths between detected object 2 and radar sensor 1. Based on the analysis of the receiving level of the two receiving signals 8, 9 in radar sensor 1 it is furthermore possible to carry out a polarimetric evaluation and thus to determine properties of the material of the reflection point and consequently, for example, to ascertain the road condition, in particular the weather-related condition of the road surface, and to utilize it for driving functions of a vehicle.

Figure 2:
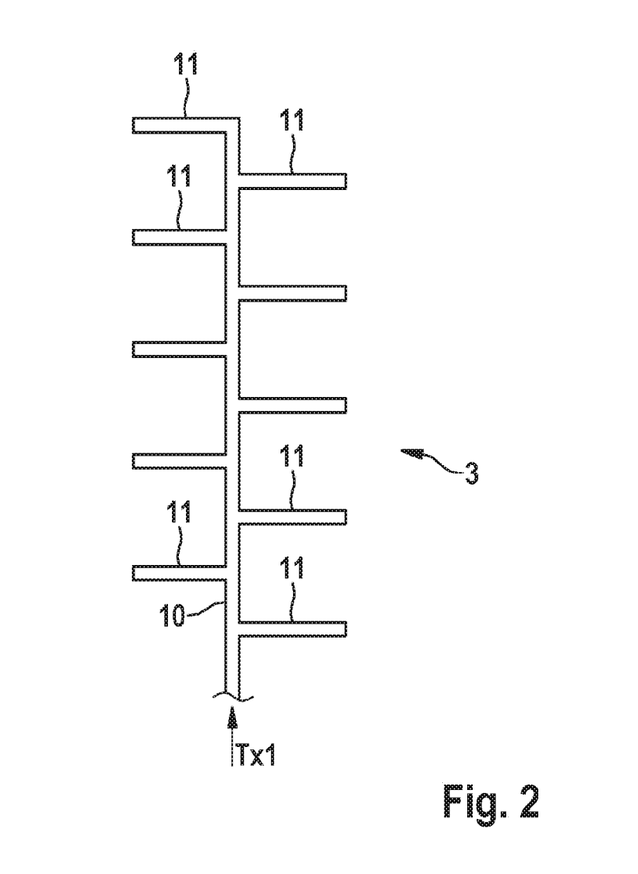
FIG. 2 shows an antenna development as a single column, which is advantageously used as a first antenna.

FIG. 2 shows a specific embodiment of the first antenna or the first group of antennas 3 for transmitting first transmission signal Tx1 having a first polarization form. When a first group of antennas 3 is used, the shown single column is developed multiple times so that it is developed as a plurality of single column antennas as a group antenna, for instance in order to increase the aperture of the device. Below, only first antenna 3 is therefore described as a single antenna but the comments also apply to the embodiment in which this single column antenna is developed multiple times and used as a group antenna. At the lower end of the image, transmission signal Tx1 is supplied, which is conveyed via a vertically aligned feed line of the antenna by way of example. The circuit board on which antenna 3 is applied is aligned parallel to the drawing surface and has a transmitter and receiver device orthogonal to the drawing plane. Stub lines or stubs are situated on this vertically aligned feed line, which act as transmission elements. The length of these stubs, the width of the stubs and also the distances between the connection points of individual stubs 11 to feed line 10 are to be dimensioned and developed as a function of the dimensioning of the antenna characteristics and the used transmission signal, in particular the transmission frequency.

Figure 3:
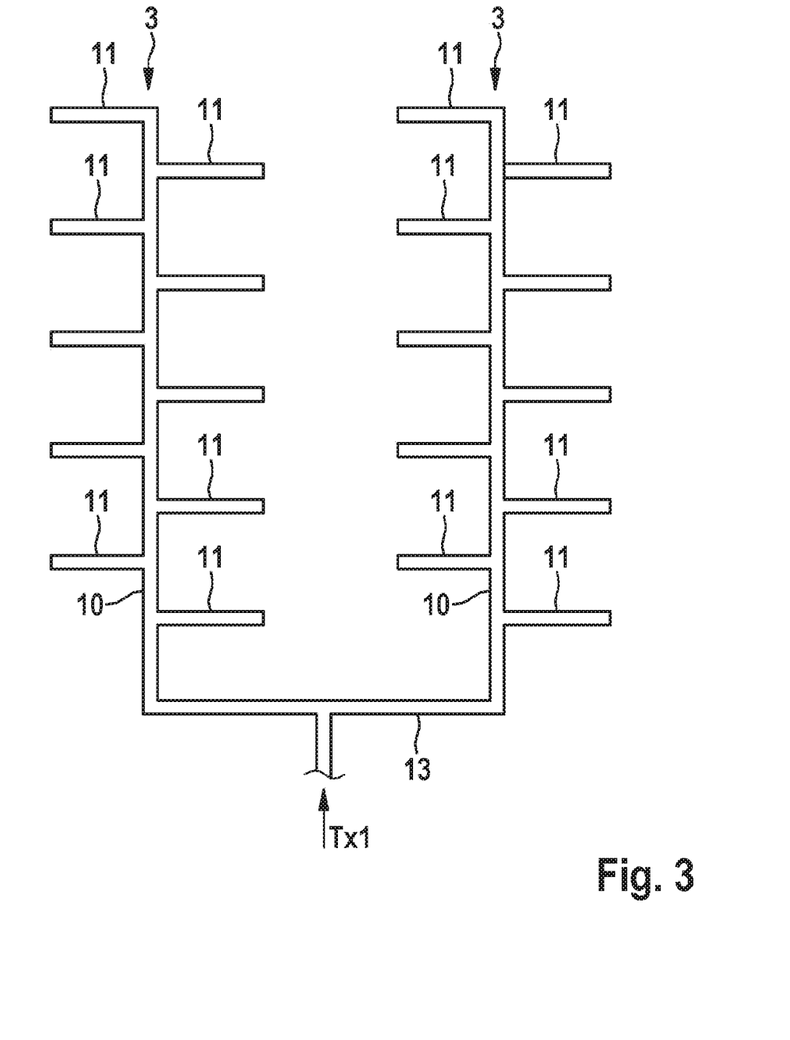
FIG. 3 shows an embodiment of the first antenna or the first group of antennas as a double column.

FIG. 3 shows another embodiment of the first antenna or the first group of antennas 3 in the form of a double-column antenna. Single-column antenna 3 described in FIG. 2 is developed in duplicate form, next to each other, the two adjacently situated antenna columns having a parallel alignment so that the two feed lines 10 run parallel to each other. Both single-column antennas of the double-column antennas are supplied by the same transmission signal Tx1 and thus emit electromagnetic radiation at the same time. Enlarging the aperture by doubling the single-column antenna from FIG. 2 into a double-column antenna according to FIG. 3 results in an antenna that has a greater range and a narrower transmission lobe. The selection of the first antenna or first group of antennas 3 as single-column antenna or double-column antenna depends on the respective transmission power, the application of the device and the propagation conditions, and is easily able to be performed by one skilled in the art.

The transmission signals emitted by single-column antenna 3 according to FIG. 2 or the double-column antenna according to FIG. 3 are horizontally polarized electromagnetic signals whose polarization plane lies parallel to the alignment of transmitter elements 11, and thus orthogonal to the alignment of feed line 10.

Figure 4:
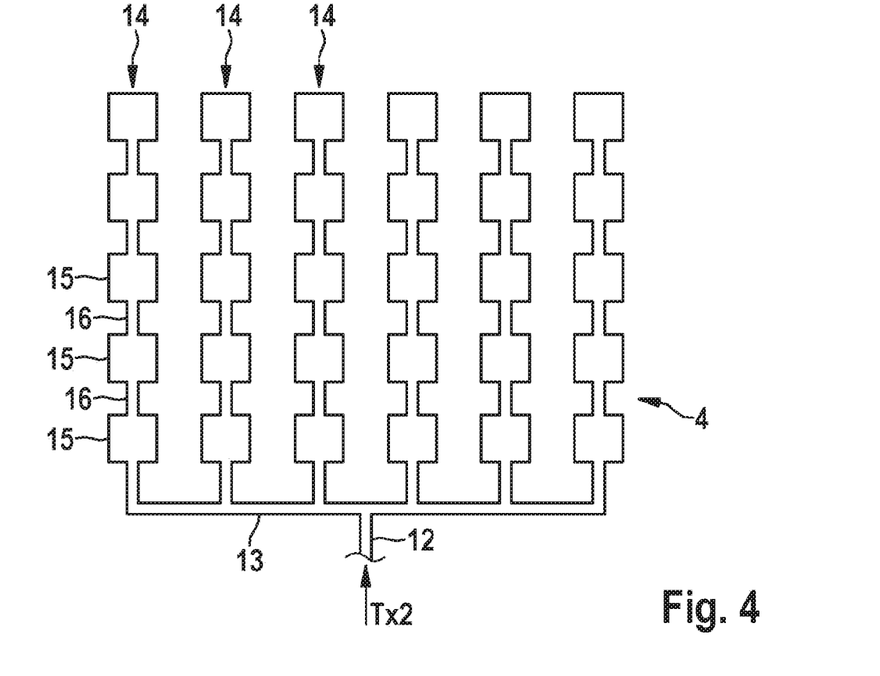
FIG. 4 shows an embodiment of the second antenna or the second group of antennas as a multi-column array of patch antennas.

FIG. 4 shows an embodiment of the second antenna or the second group of antennas 4 as a multi-column array of patch antennas transmitting in a vertically polarized manner. A feed line 12 can be seen at the lower end of FIG. 4, via which a second transmission signal Tx2 is supplied. Feed line 12 branches into a distribution line 13 to which multiple columns 14 are connected. Columns 14, which jointly form an array of patch antennas, have a parallel alignment to one another. Each column is made up of a sequence of rectangular antenna patches 15, which are serially connected to one another by serial feed elements 16. Each antenna column 14 has the same number of antenna patches 15 and also the same lengths of series feeder elements 16 between patch antennas 15. Transmission signal Tx2, which is distributed to all antenna columns 14 of array antenna 4 via distribution line 13, is emitted by antenna patches 15, the emitted electromagnetic signals Tx2 being vertically polarized signals whose polarization plane is aligned in parallel with the alignment of antenna columns 14.

Figure 5:
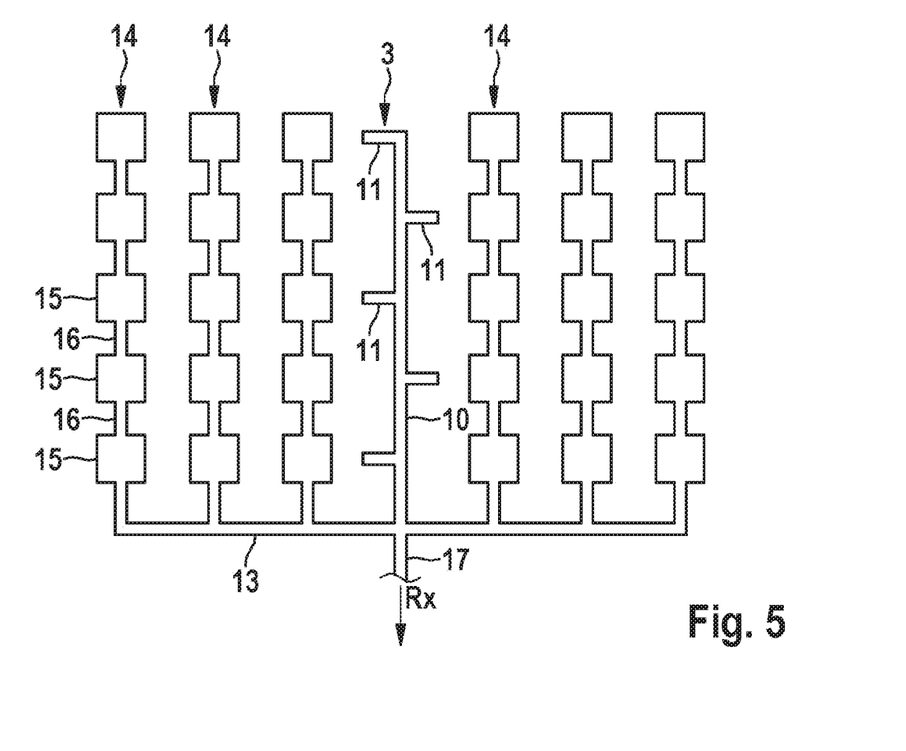
FIG. 5 shows an embodiment of the third antenna or the third group of antennas, which is made up of a combination of a single antenna column and a multi-column array of patch antennas.

FIG. 5 shows an embodiment of the third antenna or the third group of antennas 5 for receiving receiving signals Rx of both polarization forms. For example, the illustrated embodiment of this third antenna or third group of antennas 5 is made up of a multi-column array of patch antennas in which one column of patch antennas, preferably in the center of the antenna, has been omitted. Instead, a single-column antenna according to the embodiment of the first antenna or first group of antennas 3 has been inserted into this empty slot. Thus, single-column antenna 3, which is made up of a feed line 10 with branching transmitter elements 11, the stubs, is shown in the center of the antenna structure in FIG. 5. This antenna structure, which receives in a horizontally polarized manner, is surrounded on the left and right sides by the columns of the multi-column array of patch antennas that receive in a vertically polarized manner, the array being made up of multiple antenna columns 14 and of serially disposed patch antennas. All antenna structures are connected to one another with the aid of a distribution line 13, shown at the lower end of FIG. 5, and connected via a receiving line 17 to an evaluation circuit so that the receiving signal Rx is forwarded to the receiver circuit via receiving line 17. Single column 3, shown in the center of this antenna structure, may optionally also be mounted at the left edge of the antenna structure, at the right edge of the antenna structure or on both sides of the antenna structure.

Figure 6:
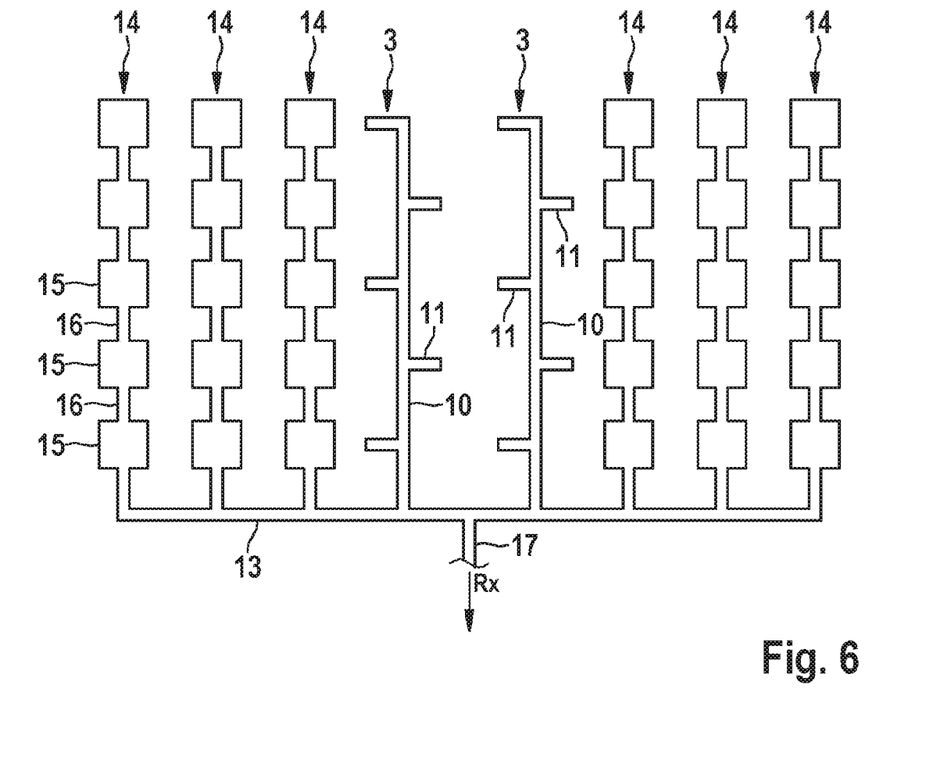
FIG. 6 shows an embodiment of the third antenna or the third group of antennas, which made up of a combination of a double antenna column with a multi-column array of patch antennas.

FIG. 6 shows a variation of the receiving antenna introduced in FIG. 5. For example, as already described in connection with FIG. 5, a structure made up of a double column according to FIG. 3 has been inserted in the center in the variant of FIG. 6. This double-column structure according to FIG. 3 is made up of two single-column antennas 3, which in turn are made up of a feed line 10 and transmitter elements 11, the so-called stubs, which receive in a horizontally polarized manner in each case. Once again, serially connected patch antenna columns 14, which function as multi-column patch antennas receiving in a vertically polarized manner, are disposed on both sides of this double-column structure. In this exemplary embodiment too, all antenna columns 3, 14 are combined via a connection line 13 or distribution line 13 into a receiving line 17 via which receiving signal Rx is able to be conveyed to an evaluation circuit 19. The exemplary embodiment of the receiving antenna shown in FIG. 6 may also be varied in a flexible manner, e.g., in that the two single columns 3 are fixed in place at the left and at the right edge of the patch antenna structure or, for example, single-column antennas 3 are alternately combined with antenna columns 14 made up of arrays of patch antennas.

Figure 7:
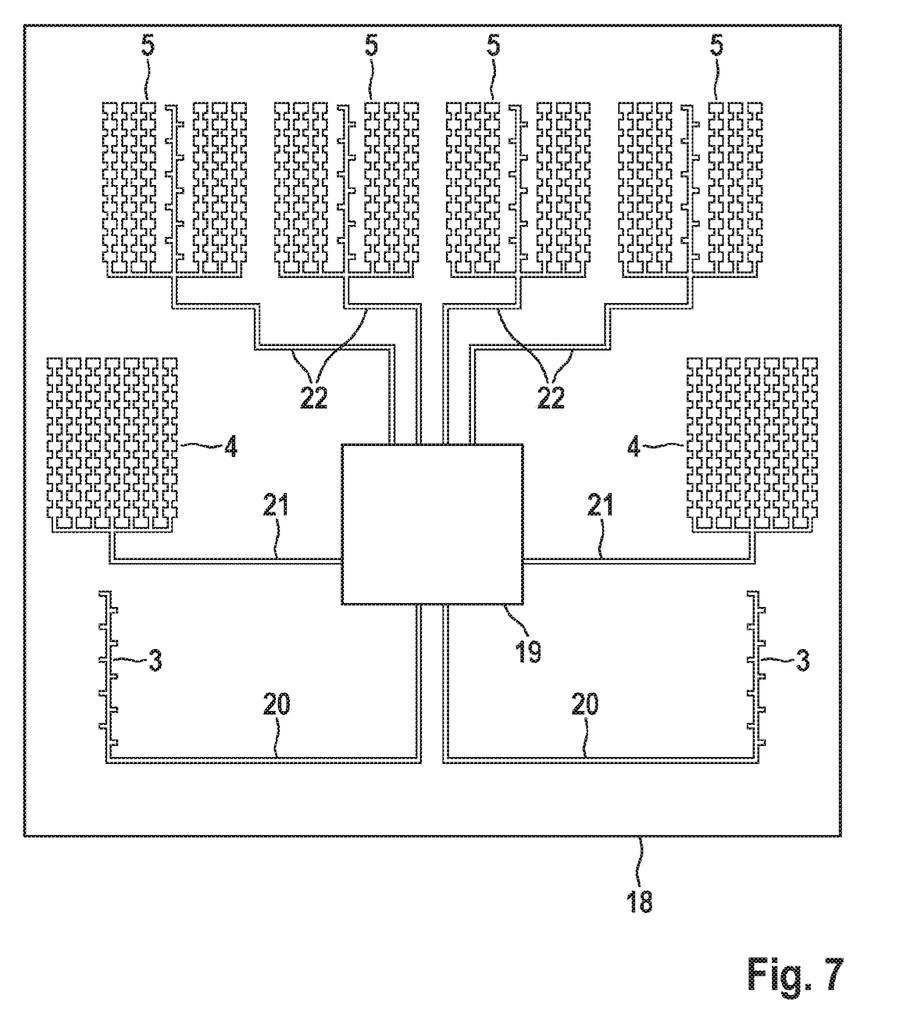
FIG. 7 shows an exemplary system of the three antennas or three groups of antennas on a circuit board.

FIG. 7 exemplarily illustrates a transmitter and receiver circuit, which may be included in radar sensor 1. A high-frequency circuit board 18 is shown on which a transmitter and receiver circuit 19 is mounted. This transmitter and receiver circuit 19 may be developed as MMIC (Monolithic Microwave Integrated Circuit), for example, and is able to generate both transmission signals Tx1, Tx2 and to evaluate receiving signals Rx. The provided antenna structures are connected to this transmitter and receiver circuit 19. In this way, the two first antennas 3 or the group of first antennas 3 is/are connected via the two feed lines 20 for the transmission of transmission signal Tx1. These first antennas 3 or first group of antennas 3 is/are the single columns 3 transmitting in a horizontally polarized manner. In addition, via feed lines 21, transmitter and receiver circuit 19 forwards transmission signals Tx2 to second antennas 4 or second group of antennas 4 transmitting vertically polarized transmission signals. These second antennas 4 or second group of antennas 4 is/are developed as a multi-column array of patch antennas. In the event that radar sensor 1 is to be used for detecting azimuth angles of detected object 2, it is useful to position first antennas 3, second antennas 4, or third antennas 5 belonging to one another horizontally next to one another in each case so that it is possible to ascertain the azimuth angle of detected object 2 via the phase differences of the single antennas of each group of antennas. Receiving antennas 5, which form third antennas 5 or the third group of antennas 5, are shown in the upper part of high-frequency circuit board 18. These third antennas 5 or this third group of antennas 5 is/are made up of a plurality of combined receiving antennas, such as four in the illustrated example, which are composed of a single column 3 and of multi-column arrays of patch antennas 14 that are situated to the left and right side in each case. This illustrated antenna structure of the overall system is naturally also variable by the alternatively illustrated embodiments featuring double-column antennas instead of the single-column antennas or other conventional variants.

For example, using the system according to FIG. 7, it is also possible to radiate a horizontally polarized transmission signal Tx1 via feed lines 20 and to emit a vertically polarized transmission signal Tx2 via feed lines 21. With the aid of receiving antennas 5 and feed lines 22, both vertically and horizontally polarized receiving signals Rx are receivable at the same time during an alternating transmission, or the corresponding receiving signal Rx may be received at all times so that no dual development of the receiving channels is necessary.

Figure 8:
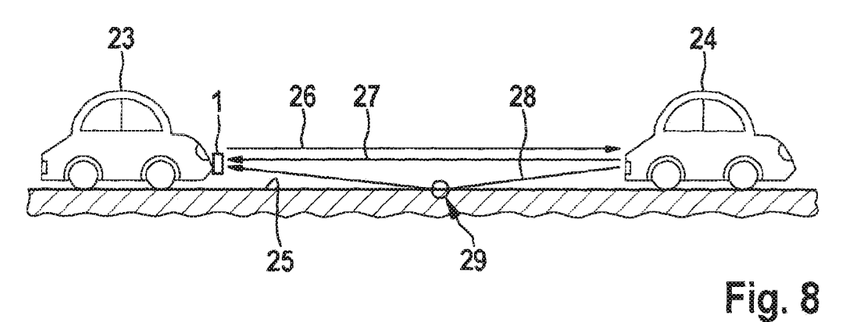
FIG. 8 shows an exemplary driving situation featuring a multi-path reception and a polarimetric evaluation of the receiving signals.

FIG. 8 shows an exemplary application of this system, in which a vehicle 23 is equipped with a radar sensor 1 at the vehicle front. This vehicle 23 drives behind a vehicle 24 traveling ahead on road 25. Radar sensor 1 is able to carry out a distance and speed control (ACC) by way of example or monitor an emergency braking functionality and trigger a possibly necessary emergency braking operation. Because of the development according to the present invention, radar sensor 1 is able to ascertain the condition of the surface of road 25, in particular the weather-related conditions of road 25. Toward this end, radar sensor 1 emits transmission signals 26 in the direction of vehicle 24 traveling ahead, i.e., detected object 2. Transmission signal 26 is made up both of horizontally polarized and vertically polarized transmission signals, which are transmitted accordingly using a conventional multiplex method such as a time multiplex.

The transmission signals reflected at preceding vehicle 24 are radiated back to radar sensor 1 as receiving signals 27, 28. It is possible that receiving signals are reflected back to sensor 1 as direct receiving signals 27. It is furthermore also possible that the receiving signals reflected at vehicle 24 driving ahead are radiated back in the direction of road surface 25 and are reflected at a reflection point 29 on the road surface and thus are received by sensor 1 as an indirect receiving signal 28 via reflection point 29. Because of reflection 29 at the road, certain polarization components of indirectly received signal 28 may be absorbed or reflected in directions other than sensor 1. As a result, by evaluating the two receiving levels of direct receiving signal 27 and indirect receiving signal 28, it is therefore possible to evaluate the reflectivity of the road surface, in particular the different reflectivity of signal components having different polarizations, thereby particularly making it possible to ascertain the weather-related condition of the road surface at reflection point 29.

Figure 9:
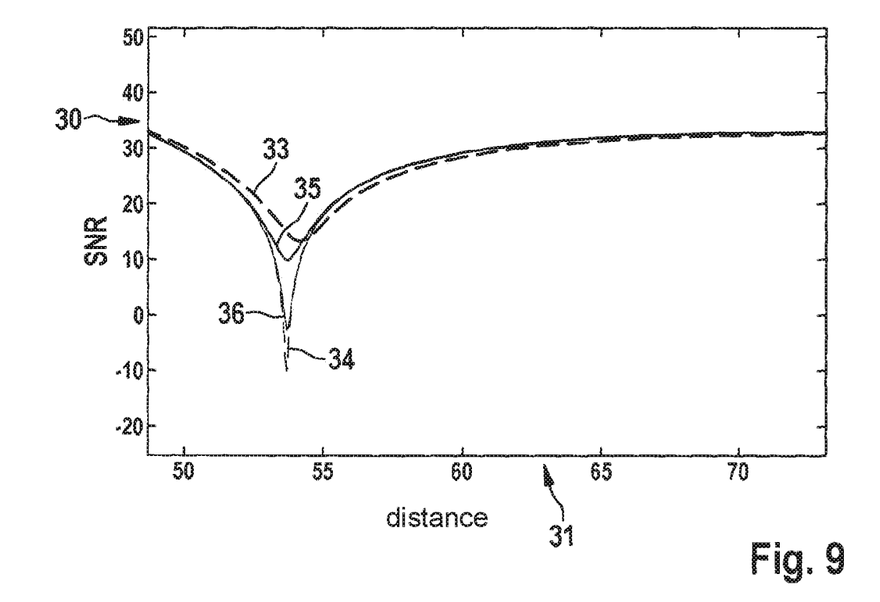
FIG. 9 shows a diagram, which illustrates the receiving levels of the different polarization forms as a function of the weather condition of the road surface.

FIG. 9 shows by way of example a diagram of the receiving signals in connection with the different weather-related conditions wet and dry. Shown on the abscissa is a distance axis 31, which indicates the distance of vehicle 24 driving ahead to ego vehicle 23. On ordinate 30, the signal-to-noise ratio SNR of the receiving levels of receiving signals 27, 28 is plotted. With the aid of the illustrated curves it is possible to distinguish between the dry and the wet case of road surface 25. For example, solid lines 35, 36 plot the characteristic of the receiving levels across the distances for a dry road, line 35 representing the vertical polarization on the dry road surface, and line 36 representing the horizontal polarization on a dry road. The vertically polarized receiving signals in this instance represent direct receiving signal 27 and the weaker receiving signal 36 represents horizontally polarized, indirect receiving signal 28. If one travels from a dry road to a wet road section, there is no change in the distance of the receiving levels but their intensities are changed. For example, the receiving level of vertically polarized, direct receiving signal 27 on a wet road is raised from curve characteristic 35 to curve characteristic 33, and indirect, horizontally polarized receiving signal 28 is attenuated from characteristic 36, so that the characteristic of dashed line 34 comes about. Because of the change in the intensities of the two receiving levels, a wet road may be inferred in this case because of the difference in the response of the curves with respect to one another and the position of the destructive interference between the two polarizations.

What is claimed is:

1. A device for emitting and receiving electromagnetic radiation, comprising:
   an evaluation circuit;
   a first antenna configured to transmit electromagnetic radiation in a first polarization form;
   a second antenna configured to transmit electromagnetic radiation in a second polarization form; and
   a third antenna comprising:
      a first column formed of a first electrical line along which a plurality of first antenna receivers are arranged in series, wherein the plurality of first antenna receivers are configured to receive electromagnetic radiation reflected from the electromagnetic radiation transmitted by the first antenna;

a second column formed of a second electrical line along which a plurality of second antenna receivers are arranged in series, wherein the plurality of second antenna receivers are configured to receive electromagnetic radiation reflected from the electromagnetic radiation transmitted by the second antenna; and a common connecting electrical distribution line (a) from which the first electrical line, which is of the first column, directly branches for provision, by the first electrical line and to the evaluation circuit, of the received electromagnetic radiation reflected from the electromagnetic radiation transmitted by the first antenna and (b) from which the second electrical line, which is of the second column, directly branches for provision, by the second electrical line and to the evaluation circuit, of the received electromagnetic radiation reflected from the electromagnetic radiation transmitted by the second antenna;

wherein the evaluation circuit is configured to identify which of the received electromagnetic radiation corresponds to the first polarization form of the transmission from the first antenna and which of the received electromagnetic radiation corresponds to the second polarization form of the transmission from the second antenna by a comparison of receiving levels of different portions of the received electromagnetic radiation.

2. The device as recited in claim 1, wherein the first polarization form and the second polarization form are mutually orthogonal polarizations.

3. The device as recited in claim 1, wherein the first antenna comprises a column formed of an electrical line along which a plurality of first antenna transmitters are arranged in series, wherein the plurality of first antenna transmitters are configured to transmit in a horizontally polarized manner.

4. The device as recited in claim 3, wherein the second antenna comprises a column formed of an electrical line along which a plurality of patch antenna transmitters are arranged, wherein the plurality of patch antennas are configured to transmit in a vertically polarized manner.

5. The device as recited in claim 4, wherein the plurality of first antenna receivers of the third antenna are configured to receive in a horizontally polarized manner according to the first antenna, and the plurality of second antenna receivers of the third antenna are patch antennas that are configured to receive in a vertically polarized manner according to the second antenna.

6. The device as recited in claim 4, wherein the first antenna has a short distance range and a large opening angle of its detection range, and the second antenna has long distance range and a small opening angle of its detection range.

7. The device as recited in claim 1, wherein (i) transmission signals of the first antenna, and (ii) transmission signals of the second antenna detect different distance ranges.

8. The device as recited in claim 1, wherein (i) transmission signals of the first antenna, and (ii) the transmission signals of the second antenna have different opening angles of a detection range.

9. The device as recited in claim 1, wherein the evaluation circuit is configured to determine polarimetric information of reflecting objects based on a comparison of receiving levels of first and second orthogonal polarization forms of, respectively, the received electromagnetic radiation provided by the first column of the third antenna and the received electromagnetic radiation provided by the second column of the this antenna.

10. The device as recited in claim 9, wherein different group factors of involved antenna transmitters and antenna receivers and different gain factors of the involved antenna transmitters and antenna receivers are taken into account when determining the receiving levels of the received electromagnetic radiation of the first and second polarization forms.

11. The device as recited in claim 1, wherein the device is fixed in place on a motor vehicle at the front of the motor vehicle, and performs an object detection for distance control, speed control, or collision avoidance.

12. The device as recited in claim 11, wherein during propagation of the electromagnetic radiation in the first polarization form and of the electromagnetic radiation in the second polarization form via different propagation paths, the evaluation circuit is configured to (a) assign a change in a receiving level of the received reflected electromagnetic radiation reflected from the electromagnetic radiation transmitted by the first antenna to a change in a direct reflection, (b) assign a change in a receiving level of the received reflected electromagnetic radiation reflected from the electromagnetic radiation transmitted by the second antenna to a change in an indirect reflection, and (c) based on a combination of the change in the direct reflection and of the change in the indirect reflection obtained from the assigned changes of the receiving levels, ascertain a weather-dependent road condition to which the combination of changes has been predefined to correspond.

13. The device as recited in claim 12, wherein the evaluation circuit is configured to ascertain the weather-dependent road condition by comparing (a) a change that occurs in the first polarization form in the received electromagnetic radiation obtained from the first column of the third antenna to (b) a change that occurs in the second polarization form in the received electromagnetic radiation obtained from the second column of the third antenna.

14. The device as recited in claim 13, wherein the ascertaining of the weather-dependent road condition includes ascertaining whether a road is wet or dry.

15. The device as recited in claim 1, wherein the evaluation circuit is configured to detect a characteristic of an object by:

weighting at least one of (a) data of the received electromagnetic radiation provided by the first column of the third antenna and (b) data of the received electromagnetic radiation provided by the second column of the third antenna; and subsequently comparing (a) the data of the received electromagnetic radiation provided by the first column of the third antenna to (b) the data of the received electromagnetic radiation provided by the second column of the third antenna, as modified by the weighting.

16. The device as recited in claim 1, wherein the plurality of first antenna receivers are each formed as a respective stub line that extends in one respective direction from the first electrical line, and the plurality of second antenna receivers are patch antennas.

17. The device as recited in claim 1, wherein the third antenna includes a plurality of the second column surrounding the first column on two sides of the first column.

18. The device as recited in claim 1, wherein the third antenna includes a plurality of the first column and includes a plurality of the second column surrounding the plurality of the first column on two sides of the first column.

\* \* \* \* \*